United States Patent Office 3,001,083
Patented Sept. 19, 1961

3,001,083
SYSTEM FOR PROTECTING ELECTRICAL EQUIPMENT AGAINST SHORT CIRCUITS
Jean Emile Trottier, Paris, France, assignor to Société à responsabilite limitée dite: Société Gram-Electric, Pantin (Seine), France, a corporation of France
Filed Feb. 19, 1959, Ser. No. 794,411
Claims priority, application France Mar. 15, 1957
9 Claims. (Cl. 307—57)

This application is a continuation-in-part of my copending application Serial No. 651,350, filed April 8, 1957, now Patent No. 2,894,148.

In order to prevent a short-circuit from resulting in such undesirable consequences as an explosion due to an arc being struck, followed by the surrounding inflammable materials bursting into flame, the use of fast-breaking automatic cut-out devices is well known. This equipment serves its purpose perfectly when connected at the end of a line, i.e. when its operation involves the stoppage of one machine only, or at most that of a small number of machines. Matters are quite different when the short-circuit occurs at a spot where circuit-breaking by the protective device causes complete stoppage of the plant, or of a very substantial part of said plant. This applies in the case of a short-circuit between the general distribution panel bus bars, or of a short-circuit inside one of the generators feeding the plant. Considering a ship, for example, a break to avoid the destructive effects of the short-circuit, if it occurs inside the distribution panel, involves total stoppage of the electrical system and, if the ship should be maneuvering in a harbor or on a difficult tack at that particular moment, the interruption of the electrical current may cause stoppage of auxiliary services essential to propulsion and deprive the ship of its maneuvering facilities so as to seriously endanger it.

One usually endeavors to correct this fault, by making the relays selective, and by scaling their corresponding time-lags, i.e. by setting the devices protecting the end lines to break very rapidly, setting the breakers protecting an important group of auxiliaries to operate after a time-lag, and retarding the operation of the breakers provided for the generating units even further. This stratagem, however, created another and worse danger, as a result of welding the contacts of breakers of too low a rating, which could fail to operate and could act as very delayed breakers.

The solution provided by the invention to avoid this risk, comprises not the delayed operation of the main breaker equipment, but means to quench the arc as soon as it is formed and to prevent its propagation, in order that damage may be kept so small and localized as not to prevent the installation from functioning, as soon as the abnormal condition causing the short-circuit has been eliminated. The means characterizing the invention apply particularly to an installation supplied by one generating unit or several such units connected in parallel, the latter being a more complex case, by virtue of the fact that the desired result cannot be achieved in full, unless several generators connected in parallel function as a single unit, i.e. are so arranged that the means used do not disrupt operation in parallel or that, if disrupted, operation is re-established smoothly, as soon as the cause of the short-circuit has been removed.

The means used according to the invention, essentially refer to A.C. systems having several phases. The generators specified are high-reactance alternators, primarily to ensure that the currents they generate when a short-circuit occurs be of minimum intensity, and on the other hand, because it is known that these high-reactance alternators, designed and constructed according to certain rules, are exceptionally stable in operation, when connected in parallel. According to previous patents held by applicant, it is in fact known that alternators of this type can be connected in parallel in full phase-opposition, and that they resume their synchronous, in-phase operation without any difficulty after a short-circuit. It thus becomes useless to fit maximum intensity or zero voltage breaking devices across their terminals, and they act as a single machine when operating on the same bars. The result is that, with several alternators connected in parallel and acting as a single unit, according to applicant's previous patents, all that is needed to prevent the destructive consequences of short-circuits, is to suppress excitation in all the machines, and not to restore it until after the short-circuit has been removed.

The phenomenon showing that the short-circuit has been eliminated, consists of the tendency of bar voltage to reappear under the influence of a certain amount of excitation, which could be partial initially and increase to full value finally.

The object of the invention consists of equipment comprising apparatus which, in conjunction with the high-reactance alternators previously mentioned, permits quenching the nascent arc and then restoration of bar-voltage.

In order to afford a clearer understanding of the general principle of the invention, several of its preferred embodiments will be described, selected by way of example but not of limitation, said description being prepared with reference to the accompanying drawings, it being clearly understood that the same purpose can be achieved by using other electrical or mechanical methods and, in particular, with relays incorporating timing mechanisms, conveniently giving the required sequence of operations, at suitably timed intervals.

Figure 1:
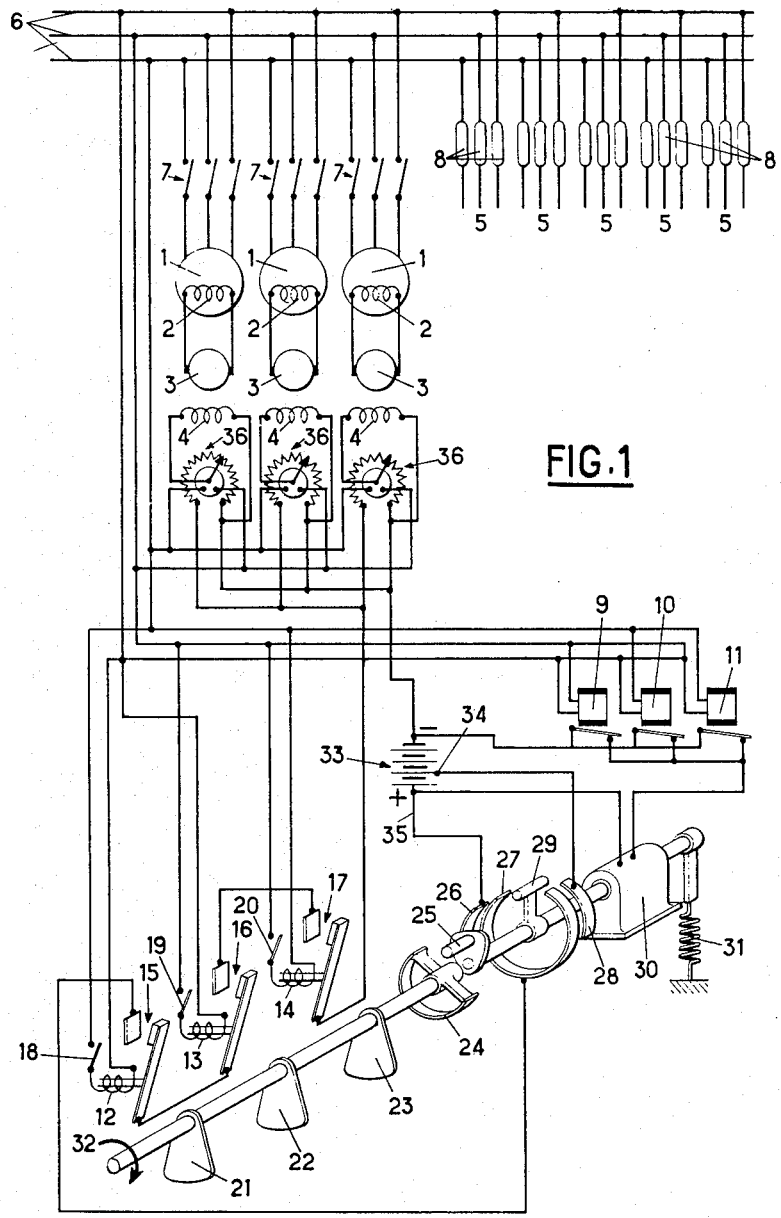
FIGURE 1 is a circuit diagram of one embodiment of the invention.

In FIG. 1 the field windings 2 of the high-reactance alternators 1 are excited by the exciters 3, the field windings 4 of which are separately supplied by storage batteries 33. This separate supply may be replaced by shunt excitation, by inserting in its circuit resistances of the appropriate values to obtain the same effect. In the example described, the windings 4 are fed through automatic voltage regulators 36. This current also flows through the principal contacts 15, 16 and 17, fitted in series, of the three quick opening relays 12, 13 and 14. Said current then passes through the sectors 27 and 26 of a rotary switch. The connection 35 completes the D.C. supply circuit of the inductors of the alternator exciters. The solenoids keeping the quick opening relays 12, 13 and 14 closed are each supplied by a phase of the alternators through the bus bars 6. The current supplied to these solenoids, however, passes through their own supply switches 18, 19 and 20, which are held closed only by energization of the solenoids they serve so as to ensure that if one of the relays opens for any reason, it cannot close again automatically. Closing of these relays is carried out mechanically, by means of the cams 21, 22 and 23, which, when turned in the direction shown by the arrow 32, exert pressure on the relay armatures and keep them closed. These cams are fixed on a common shaft, whereon a mechanical sector 24 is splined. Said sector is actuated by a pin 25 fixed to a shaft carrying the electrical sectors 26, 27 and 28. The electrical contact 29 connects the central sector 27, either with sector 26, when the devices returns to its state of rest owing to the action of the spring 31, or with sector 28, when the small servo-motor 30 drives the assembly in the direction shown by the arrow 32. Said servo-motor operates on direct current and is fed by the storage battery 33. Its supply current passes through the series connected contacts of three slow-breaking relays 9, 10 and 11. The solenoids of these relays are connected to the three phases of the bus bars 6. The difference between the three quick opening relays 12, 13 and 14, and the three slow-breaking relays 9, 10 and 11, is the following: The three quick opening relays 12, 13 and 14, each have a very simple magnetic circuit, formed by a simple A.C. solenoid, as shown in the drawing. These solenoids, designed to keep the relay closed when bar voltage is normal, release their armatures as soon as a voltage drop of the order of 25% occurs in these bars. They have low inertia and operate quickly, but cannot reset themselves when the voltage returns to normal. The result is, that when a short-circuit occurs, e.g. when a metal object falls across the bars or the terminals of a live machine, it produces a series of arcs, the first of which causes a voltage drop in at least one of the three phases, equal to or exceeding 25%, even if the short-circuit does not divert the entire current. One of the relays 12, 13 or 14, opens and cannot reset itself, since one of the switches 15, 16 or 17 de-energizes its solenoid. Interrupting the excitation of the exciters 3 causes the complete disappearance of voltage on the bars 6, and the nascent arc is quenched before it has had time to propagate itself and cause damage. It has however been noted that, in order to respond to the first voltage drop, the relays 12, 13 and 14 cannot reset themselves. The short-circuit may have been only temporary on a terminal 5 and been eliminated by the fuses 8, or else the foreign body causing it may have been ejected immediately owing to electromagnetic repulsion effects. It is important, particularly when equipment aboard ship is concerned, to immediately restore the voltage. Restoring normal voltage is the function of the relays 9, 10 and 11, and of all equipment actuated by the D.C. motor 30. Said voltage restoration is carried out in two stages: When the relays 12, 13 and 14 have cut all excitation off in order to quench the nascent arc, the voltage drops to a lesser value than that at which relays 9, 10 and 11 are rated and set, and operates said relays to close their contacts. This value is adjustable between a quarter and a third of normal voltage, but the operating voltage should not differ from the resetting voltage by more than about 15%.

When one or all the relays 9, 10 and 11 operate, the motor 30 is supplied and rotates the shaft of the device in the direction shown by the arrow 32. The electrical contact 29, which when at rest connects the two sectors 26 and 27, begins by breaking this contact (the current flowing through these sectors already having been interrupted by the opening of relays 12, 13 and 14) and establishes the connection between sectors 27 and 28. By means of the connection 34, only a part of the storage battery is used, which results in an excitation too small to restore the arc.

Continuing to rotate, the motor turns the shaft carrying the cams 21, 22 and 23. These latter reset the relays 12, 13 and 14 and their associated switches 18, 19 and 20 mechanically, by replacing their armatures into the closed position. At the end of travel position, the motor will remain locked, after having stretched the spring 31 to its maximum. Everything remains unaltered for as long as the short-circuit persists, since relays 9, 10 and 11 will remain closed and the motor 30 thereby supplied with current. If, however, the short-circuit is eliminated, either by a protective device 8, in the case of an accident to a part of the installation such as a terminal 5, or if the object causing bus-bar shorting has been ejected, the excitation current supplied through the connection 34 is sufficient to restore a voltage on the bars 6, at least equal to that causing resetting of the relays 9, 10 and 11, which, as stated, reopen themselves automatically at a voltage to be set between a quarter and a third of standard voltage. If the relays 9, 10 and 11 are reopened, the supply to the motor 30 is cut and the spring 31 restores the entire device to the rest position. Initially, and by virtue of the free space left between the pin 25 and the mechanical sector 24, it is the electrical contact 29 which will first disconnect the two sectors 27 and 28 electrically and reconnect sectors 26 and 27 to each other. This operation replaces the whole of the storage battery in service, thanks to the connection 35, i.e. restores standard alternator excitation. Normal voltage will reappear on bars 6, as well as across the terminals of the relays 12, 13 and 14, which will remain closed. Continuing to act, the spring 31 restores the cams 21, 22 and 23 to their inactive position, fully freeing relays 12, 13 and 14, which are then ready to operate again. If the short-circuit has not been eliminated completely and voltage on the bars 6 has been restored too soon, a new arc is struck and the relays 12, 13 and 14 open again, causing the device to repeat its operational cycle. But the re-established arc, being immediately quenched within a second or two, has no time to ionize the air surrounding the location of the short-circuit and to propagate itself so as to cause substantial damage. The equipment is thus protected against material damage caused by short-circuits.

Figure 2:
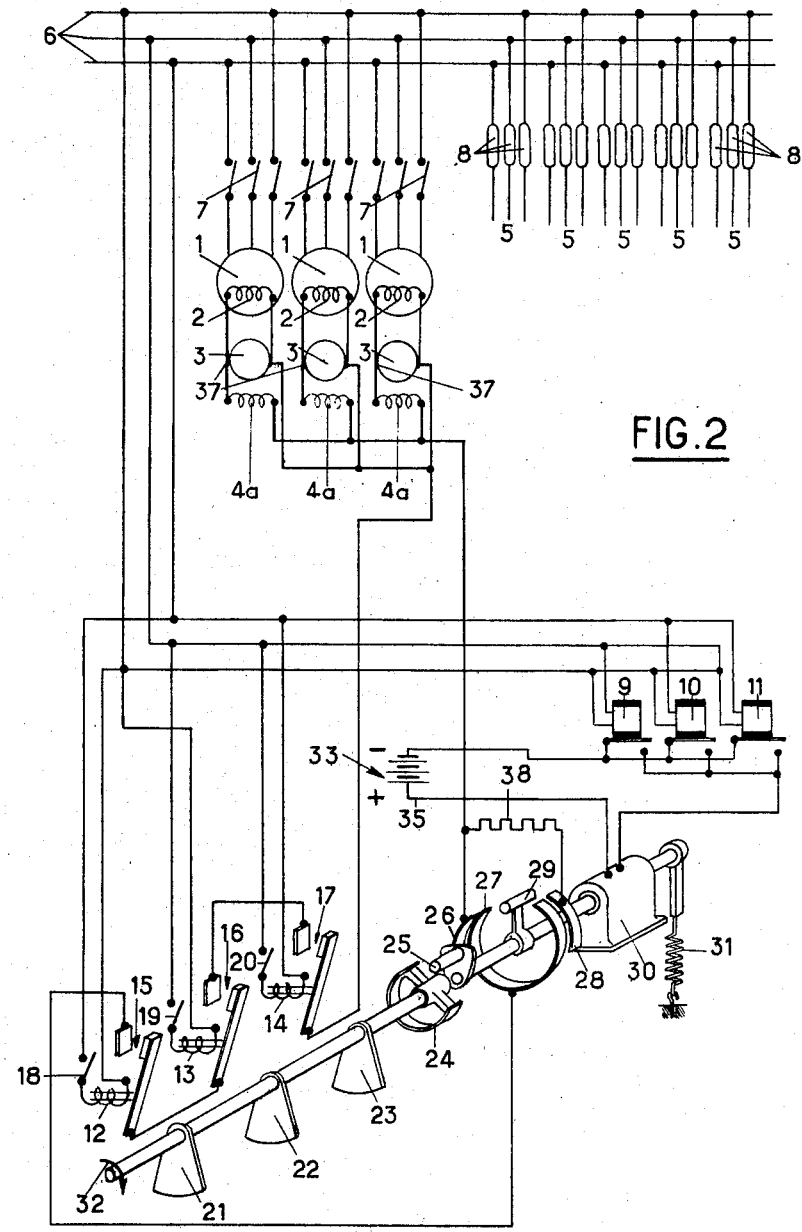
FIGURE 2 is a circuit diagram of a second embodiment of the invention, the alternator exciters being shunt excited.

The embodiment shown in FIG. 2 differs from that of FIG. 1 only by virtue of the fact that instead of the sector being connected to the positive terminal of the battery 33, it is connected to one end of each of the three windings 4a providing excitation for the exciters 3, the other ends of said windings each being connected to the corresponding one of the poles 37 of the exciters 3, and that the sector 28 is connected to sector 26 through a resistance 38, making it possible to reduce the excitation of the exciters 3, when the electrical contact 29 is connected between the two sectors 27 and 28.

In this embodiment, the servo-motor 30 remains supplied by the storage battery 33, but the exciter 3 excitation is taken from the exciters themselves by means of a shunt connection, interpolating a resistance of such value that sufficient voltage is nevertheless available across the bars 6 to cause resetting of the relays 9, 10 and 11, restoration of normal excitation and voltage across the bars 6 being effected as in the version shown by FIG. 1.

Figure 3:
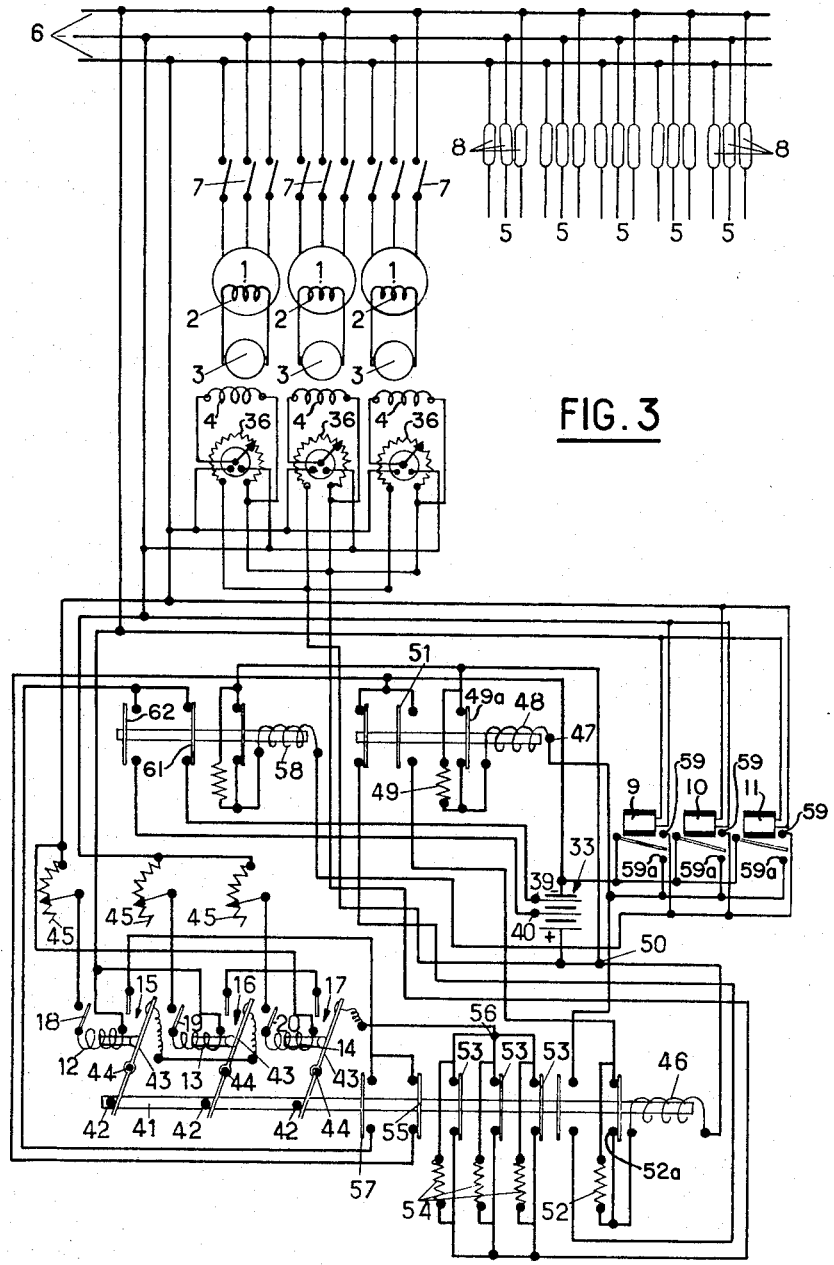
FIGURE 3 shows a third embodiment, in which resetting is assured by means of relays, without using a servo-motor.

In the embodiment shown in FIG. 3, the battery 33 comprises two reduced voltage supply points 39 and 40, usable in cases where the short-circuit is a three-phase or single-phase one respectively, the voltage usable in the case of a single-phase short-circuit being lower than for a three-phase short-circuit.

In this embodiment, the cam shaft actuated by a servo-motor in the devices hereinbefore described, is replaced by a bar 41 acting on the extensions of the armatures 43 of the rapid release relays 12, 13 and 14 by means of three pegs 42, these three armatures being capable of being pivoted about the three corresponding pins 44.

It is clear that the pivotal axes of the three armatures may lie in the same line, with the coils 12, 13 and 14 pointing in a suitable direction; the bar 41 would then actuate a tie-rod coupling the three armatures together and in the same plane as these latter, by means of an appropriately shaped hook.

The quick opening relays 12, 13 and 14 are connected between the three corresponding distribution phases 6, in series with resistances 45, which sensitize them and reduce their time-constant.

The bar 41 is controlled by a solenoid 46 which, the moment it is excited, causes mechanical resetting of the three relays 12, 13 and 14 and the closure of their own supply switches 18, 19 and 20.

The device according to FIG. 3 functions as follows: When an excessive voltage drop occurs in phases 6, the relays 12, 13 and 14 open, these relays being sensitized as stated by means of the resistances 45 connected in series with their coils.

The opening of contacts 15, 16 and 17 eliminates the excitation of the exciters, by interrupting the connection between the negative terminal 56 of the battery 33 and a terminal common to the voltage regulators 36.

In the absence of voltage across the bars 6, the relays 9, 10 and 11, which are no longer supplied, operate in their turn, with the result that the negative terminal of the battery is connected through contacts 59a to the end 47 of the relay coil 48, as well as to the positive terminal 50 of the storage battery 33, through a resistance 49 forming an economizer.

The supply to coil 48 establishes, by means of its armature 51 and after a certain delay, a connection between the contacts of a switch interposed between the negative terminal of the battery and an economizer resistance 52 in series in the supply line to the solenoid 46, the supply to solenoid 46 resulting in the attraction of bar 41, causing mechanical resetting of the three relays 12, 13 and 14.

However, the moment solenoid 46 causes said resetting, the three contact bars 53 integral with bar 41 break the connections short-circuiting the three corresponding resistances 54.

The excitation current is therefore restored in the windings 4 of the alternator exciters at a reduced value only.

Actuation of the solenoid 46, acts through the bar 41, independently of its economizer contacts 52a and of those connected by the contact bars 53, to interrupt the direct connection between the negative terminal of the battery and the common point 56 at one end of the three resistances 54, by displacing the connecting arm 55.

Movement of the bar 41 has also established a connection between the common point 56 through switches 15, 16 and 17 to one of the reduced voltage supply points 39 and 40 of the storage battery 33 by means of the connecting arm 57, the point selected depending on the position of a relay 58, whose function will be explained further on.

When voltage is restored across bars 6, the relays 9, 10 and 11 reset themselves by cutting the current to relay 48.

This latter, on being released, in its turn interrupts the supply to coil 46 by resetting bar 41 into its passive position, thus leaving relays 12, 13 and 14 free to operate again when required.

At this moment, these three relays 12, 13 and 14 having been reset, full excitation is restored in the windings 4 of the alternator exciters.

The purpose of relay 58 is to select a supply point on the storage battery 33, with a lower voltage for a single-phase short-circuit than for a three-phase one.

This selection is effected very simply by means of the connection existing between the contacts of relays 9, 10 and 11.

The coil of relay 58 is supplied in the normal position, since the contacts of relays 9, 10 and 11 are against the upper contacts 59, which connects the negative terminal of the battery to one of the ends of the coil of said relay 58.

If the short-circuit is a three-phase one, the three relays 9, 10 and 11 open and cut off the supply through contacts 59 to the solenoid of relay 58, thus making the connection between point 56 and supply point 39 of the battery through contact bar 61 of relay 58.

If, however, the short-circuit is a single-phase one, the solenoid of relay 58 continues to be supplied through one of the three contacts 59 corresponding to the one relay out of the three which did not operate, supply point 40 of the battery 33 then being connected to point 56 through contact bar 62 of relay 58 to allow the excitation windings 4 of the exciters 3 to be fed, during the time the relays 12, 13 and 14 are being reset mechanically, when solenoid 46 is being fed.

The moment solenoid 46 is no longer supplied, the negative terminal of the battery is again connected directly to point 56 by the armature 55.

As shown above, the voltage used in the case of a single-phase short-circuit is that existing between terminal 40 and the positive terminal 50 of the storage battery 33, and in the case of a three-phase short-circuit, the slightly higher voltage existing between the terminal 39 and the positive terminal 50.

It goes without saying, that the embodiments described may be modified, improved or added to in various ways, or certain devices may be replaced by equivalent devices, without thereby departing from the basic principle of the invention.

What is claimed is:

1. System for protecting electrical equipment against short circuits for use in connection with installations comprising at least one high reactance polyphase alternator having a field winding the excitation for which is derived from an exciting circuit, which system comprises a plurality of quick acting relays connected in series in said exciting circuit, each of which is provided with electrical actuating means connected across one phase of said alternator and energized to hold said relay closed when the voltage drop across said phase is normal, but adapted to automatically open said relay when said phase voltage falls substantially below normal, said relays being incapable of automatically reclosing, means for varying the exciting current in said exciting circuit, which is normally maintained in a first position in which a normal exciting current is supplied to said field windings but movable to a second position in which a reduced exciting current is supplied thereto, means for mechanically closing said quick-opening relays, which is normally biased to a position permitting said relays to open, power means for moving said current varying means to said second position and driving said mechanical relay closing means, an electric circuit for supplying said power means, slowly acting relays in said last mentioned circuit which are automatically opened by the flow of current in said phases and closed in the absence of such flow, thereby energizing said power means to institute a reduced excitation of said field coils and reclose said quick acting relays when said phase current fails, but de-energizing said power means and permitting restoration of said normal excitation when said reduced excitation results in restoration of said phase current to a predetermined fraction of its normal value.

2. A system as claimed in claim 1 in which said quick-acting relays are prevented from automatically reclosing by switches in the circuits supplying their solenoids which are automatically opened upon failure of the current in said supply circuits, and said switches are automatically reclosed when said quick-acting relays are reclosed.

3. A system as claimed in claim 1 in which said exciting circuit includes a D.C. power source, said slowly acting relays when closed connect said power source to said power means, and said mechanical relay closing means comprise cams mounted on a shaft turned by said power means, which shaft also carries means for altering the connections of said power source in said exciting circuit which constitute said means for varying said exciting current, said shaft being spring biased to its said first position.

4. A system as claimed in claim 1 in which said exciting circuit comprises a shunt excited exciter and said means for varying the current in said exciting circuit consists of a resistance and means for inserting it into said exciting circuit.

5. A system as claimed in claim 1 in which said means for mechanically closing said quick acting switches comprises a movable bar provided with means for engaging the movable arms on said switches, and said power means comprises a solenoid for moving said bar.

6. A device as claimed in claim 1 in which said exciting circuit comprises a storage battery provided with a plurality of terminals from which different voltages may be drawn, and said current varying means comprises means for alternatively connecting one pair or another of said terminals into said exciting circuit.

7. A system as claimed in claim 6 in which the closing of all of said slowly acting relays completes a circuit through one of said pairs of terminals and said power means, whereas if only one of said slowly acting relays is closed a circuit is completed through said power means and a different pair of terminals delivering a lower voltage.

8. A system as claimed in claim 1 comprising a plurality of alternators connected in parallel.

9. A system as claimed in claim 8 in which said alternators are controlled by voltage regulators and their exciting circuits incorporate the variable resistances of said voltage regulators in series.

No references cited.